United States Patent [19]
Johnson et al.

[11] Patent Number: 5,871,182
[45] Date of Patent: Feb. 16, 1999

[54] MODULAR TUBING SUPPORT AND CONSTRAINMENT DEVICE

[75] Inventors: Michael W. Johnson, Minneapolis; Jeffrey J. McKenzie, Watertown, both of Minn.

[73] Assignee: Fluoroware, Inc., Chaska, Minn.

[21] Appl. No.: 794,972

[22] Filed: Feb. 5, 1997

[51] Int. Cl.⁶ ...................................................... F16L 3/00
[52] U.S. Cl. ............................................................ 248/49
[58] Field of Search .............................. 248/49, 68.1, 53, 248/58

[56] References Cited

U.S. PATENT DOCUMENTS

| | | | |
|---|---|---|---|
| 2,002,103 | 5/1935 | Wheeler | 248/49 |
| 2,355,742 | 8/1944 | Morehouse | 248/68.1 |
| 3,042,351 | 7/1962 | Du Bois | 248/49 |
| 3,508,730 | 4/1970 | Knezo. | |
| 3,618,882 | 11/1971 | Podeworny | 248/68.1 |
| 3,787,016 | 1/1974 | Laval, Jr. | 248/49 |

FOREIGN PATENT DOCUMENTS

| | | | |
|---|---|---|---|
| 0461974 | 12/1991 | European Pat. Off. . | |
| 0723102 | 7/1996 | European Pat. Off. . | |
| 1339214 | 8/1963 | France | 248/49 |
| 2686141 | 7/1993 | France | 248/49 |
| 897951 | 7/1960 | United Kingdom . | |
| 2055441 | 3/1981 | United Kingdom . | |
| 2209632 | 5/1989 | United Kingdom . | |
| 2314216 | 12/1997 | United Kingdom . | |
| 89/02179 | 3/1989 | WIPO | 248/49 |

OTHER PUBLICATIONS

Cable Tray Systems, Airedale Sheet Metal Ltd, 1989, pp. 2, 9, 11.
Chemins de Cables: Echelles a Cables, Tolartois, 1988, pp. 34,39,42,57–Fig. 150.
General Catalogue, Unex, 1993, pp. 12, 15, 18.

*Primary Examiner*—Ramon O. Ramirez
*Attorney, Agent, or Firm*—Palmatier, Sjoquist, Voigt & Christensen, P. A.

[57] ABSTRACT

A modular tubing support and constrainment device for supporting and constraining tubing comprising a plurality of modular support trays, a module connector portion and a clamping portion. The modular support trays each incorporate a bottom portion for supporting the tubing and side constrainment portions to significantly constrain the amount of snaking by the tubing. The modular support trays further incorporate a plurality of apertures which are used by the module connector portions to connect and join the modular support trays into a continuous single unit. The apertures are also used by the clamping portion so that the clamping block may be secured to the modular support tray. The clamping block has an arcuate bore therethrough that is sized to fit snugly about and constrain the tubing. The bore may be lined with an elastomeric material to provide extra tube gripping potential.

20 Claims, 4 Drawing Sheets

MODULAR TUBING SUPPORT AND CONSTRAINMENT DEVICE

BACKGROUND

This invention relates to guide trays and more particularly to a guide tray capable of supporting and constraining flexible tubing.

A number of industries, such as the food processing and pharmaceutical industries, have traditionally used stainless steel tubing or piping for the transfer of fluid materials in various processes. In such processes the temperature of the fluid conveyed by the tubing may vary dramatically often in excess of 100° C. Particularly, in sanitary systems cleaning of tubing systems is accomplished with steam. Moreover, in such processes the tubing lines are ideally positioned to allow free draining of the lines. That is, positioned at an incline without low undrainable collection areas. With stainless steel tubing expansion and contraction of the tubing was minimal and could easily be accommodated by the tubing. Moreover, the rigidity and strength of stainless steel tubing allowed extended runs at an incline using intermittent supports without creating low hanging, non-drainable areas. Use of stainless has some problems including cost, difficulty in fabrication and susceptibility to corrosion in some sanitary applications.

Plastic tubing and fittings have become more prevalent in sanitary systems due to many advantages including cost, ease of assembly, and resistance to corrosion. However, plastic tubing is substantially more flexible than stainless and is much more susceptible to expansion and contraction due to temperature changes. A ten-foot length of plastic tubing can change in length by almost an inch which is approximately one hundred times greater than stainless. Tubing that has been pulled taught during installation will expand and contract and can cause extreme stress on the tube fittings eventually causing them to fail. Tubing that has been installed with a certain amount of slack will also experience the expansion as well as snaking. Uncontrolled snaking can also cause extreme stress on the tube fittings creating a potential for failure.

As a solution to these problems, various installations now incorporate large amounts of slack, e.g. u-shaped sections of tubing to accommodate the changes in tubing length due to temperature changes. These u-shaped sections of tubing do help to reduce the amount of pressure placed on tube fittings by expansion and snaking, however, new problems are introduced. Most importantly, obvious draining problems result. Moreover, additional amounts of tubing create additional expense. Further, the u-shaped sections take up valuable space that might otherwise be dedicated to additional fluid transfer lines. Moreover, numerous u-shaped sections will cause pressure losses throughout the length of the line which may create problems for the machinery the tubing is feeding.

In order to accommodate the inherent flexibility or lack of rigidity, long runs of tubing either need a radical incline or must incorporate numerous tubing supports in order to avoid low dangling, non-draining sections.

As well, sanitary tubing, piping, hoses, and associated connectors used in the food processing and pharmaceutical industries must meet sanitary requirements such as those set forth in the United States Code of Federal Regulations, 7 C.F.R. §58.128. The standards provide that the conduit be smooth, permit laminar flow of fluids and be free of discontinuities that could trap particulate matter. The fluid path must also be free of crevices that could give rise to capillary action that might allow the fluid being transported to accumulate and possibly putrefy. The addition of u-shaped tubing sections only multiplies the possibility of unwanted discontinuities and crevices.

In light of the above, there is a need for a guide tray that will eliminate the necessity of u-shaped sections and the problems associated with them, that will support the flexible tubing, that will constrain the amount of snaking by the tubing, that will significantly reduce the amount of stress placed on the tube fittings and further, that will be variable in length and configuration such that the guide tray may be adjusted to the length and configuration of the tubing run.

SUMMARY

A modular tubing support and constrainment device for supporting and constraining flexible tubing comprising a plurality of modular support trays, each of the modular support trays having a bottom portion, a side constrainment portion engaged with the bottom portion and a plurality of apertures. A module connector portion incorporates a plurality of connectors that are removably insertable through the modular support tray's apertures and removably attachable to the modular support tray. A clamping portion that is removably attachable to the modular support tray is also included.

An object and advantage of the modular tubing support and constrainment device is that it provides a support surface that the flexible tubing may lie upon or rest against and further provides side constrainment preventing the tubing from excessive snaking and stress on tube fittings.

Another object and advantage of the modular tubing support and constrainment device is that the necessity of incorporating u-shaped tubing sections into the tubing runs is eliminated. Further, the problems associated with the u-shaped tubing runs, i.e. additional tubing expense, additional space requirements, pressure losses, and draining problems, have been eliminated.

Another object and advantage of the modular tubing support and constrainment device is that it incorporates a plurality of apertures. These apertures are multi-functional: (1) they are used by the module connectors to join the sections of the modular support trays; (2) they are used by the clamping portion to secure the clamp to the modular support tray; (3) they additionally serve as drainage holes such that a damaged or ruptured tubing run might be detected as the fluid seeps through the apertures; and (4) the apertures also allow observation of the tubing and fluid flowing through it.

Yet another object and advantage of the modular tubing support and constrainment device is its modularity. The modular support trays may be joined together by the module connector portions in any length and virtually any configuration as the module connector portions may be configured as elbow and tee sections or other configurations as needed.

Still another object and advantage of the modular tubing support and constrainment device is that it incorporates a clamping portion. This clamping portion is generally of a block configuration having an arcuate bore therethrough. The arcuate bore surrounds the flexible tubing securing it to the modular support tray and constraining its expansion thereby preventing movement and associated stress at the tube fittings. Additionally, the arcuate bore may be lined with an elastomeric material to better grip the tubing.

DESCRIPTION OF THE DRAWINGS

These and other features, aspects and advantages of the present invention will become better understood with regard to the following descriptions, appended claims, and accompanying drawings, where:

FIG. 4 is a front elevation of the present invention showing in detail the configuration of the clamping portion;

DETAILED DESCRIPTION

Figure 1:
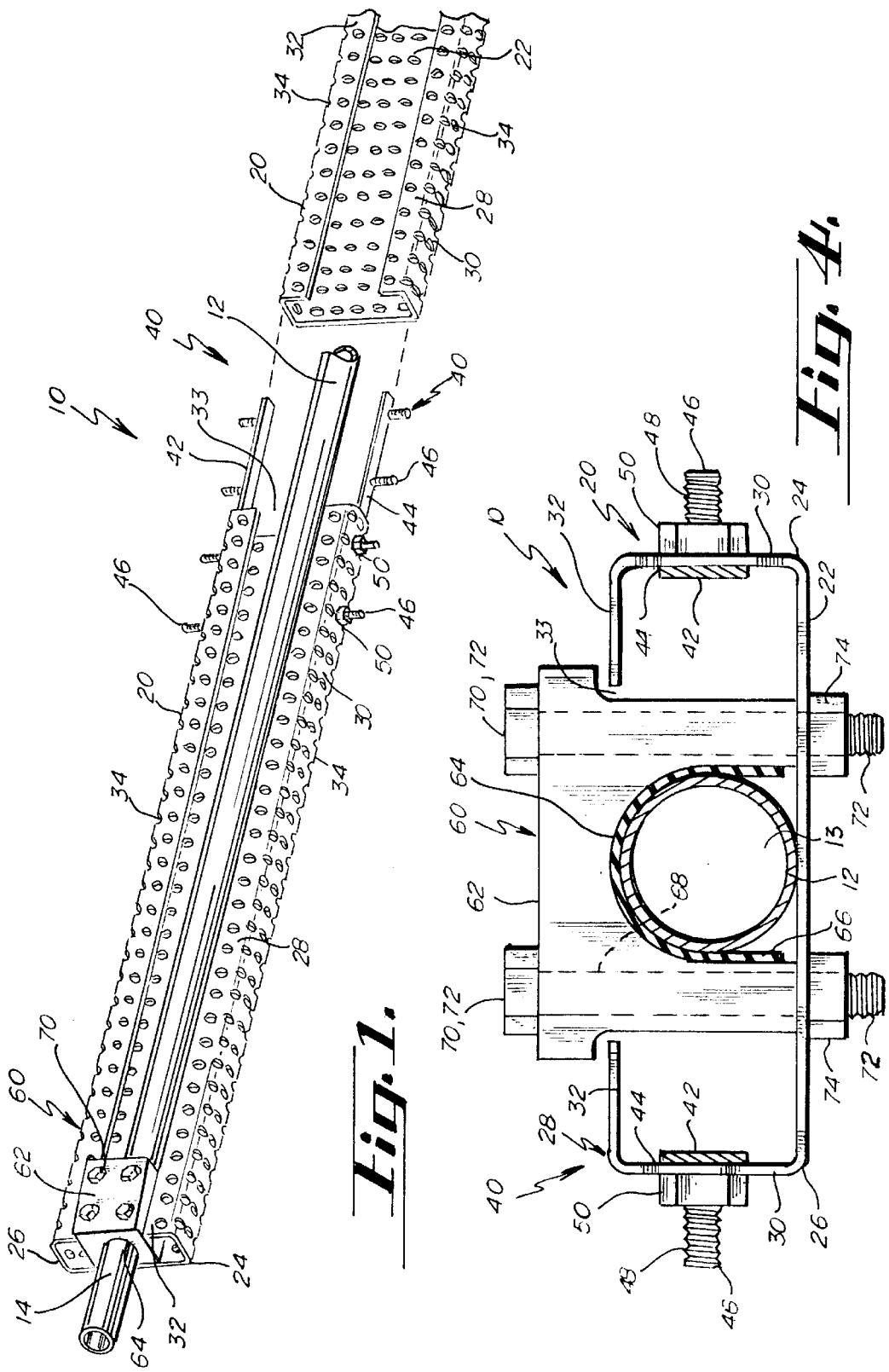
FIG. 1 is a perspective view of the present invention showing how two modular support tray sections may be joined with a straight module connector portion.
Figure 2:
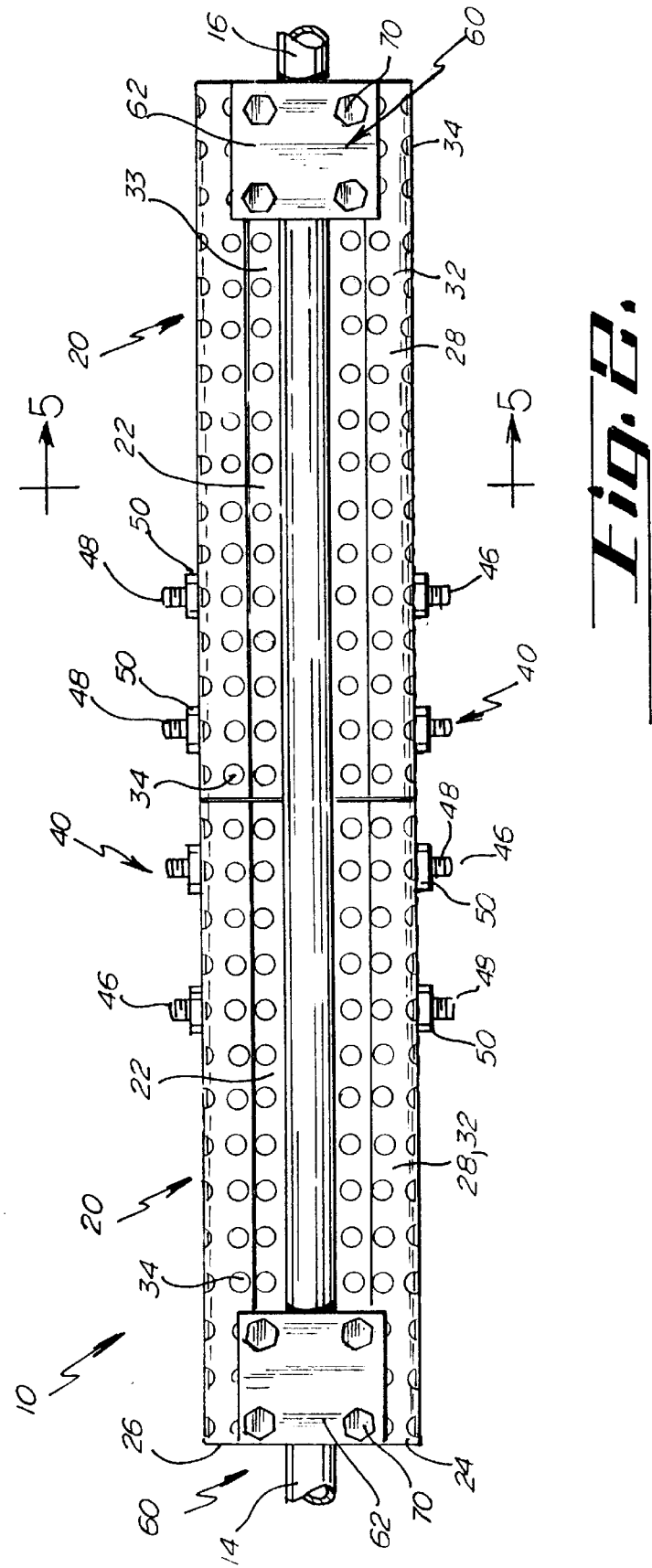
FIG. 2 is a top view of the present invention depicting two connected modular support trays and clamping portions at the first and second ends of the tubing.

A modular tubing support and constrainment device for supporting and constraining flexible tubing 12 and piping may generally be seen in FIGS. 1 and 2 and is generally designated by the numeral 10. The modular tubing support and constrainment device 10 comprises a plurality of modular support trays 20, module connector portions 40 for connecting and joining the modular support trays 20, and a clamping portion 60 for clamping and/or securing the flexible tubing 12 to the modular support tray 20.

The modular support tray 20, which functions as the modular tray means, incorporates a bottom planar portion 22 that is the support means for the flexible tubing 12. The bottom planar portion 22 has a first side 24 and a second side 26. Engaged with each side 24, 26 is a side constrainment portion 28. Each side constrainment portion is comprised of a side planar portion 30 that is preferably integral with the sides 24, 26 of the bottom portion 22 and a top planar portion 32 that is preferably integral with the side planar portion 30. The side constrainment portion 28 extends up and around to create an open top channel 33, the width of the open top channel equivalent to the spacing between the two top planar portions 32. The top planar portions 32 should be spaced far enough apart to fully accommodate the diameter of the selected flexible tubing 12.

The bottom planar portion 22, the side planar portion 30 and the top planar portion 32 of the modular support tray 20 are of a uniformly narrow thickness. The height of the modular support tray 20 is defined by the height of the side planar portion 30 and by whatever additional height is added by the thickness of the top planar portion 32. In general, this height should be equivalent to or greater than the diameter of the flexible tubing 12 that modular support tray 20 supports. If such a height is chosen, the tubing 12 will snake within top and side planar portions 32, 30 of the side constrainment portion 28; a lesser height may cause the tubing 12 to hop out of the modular support tray 20 when snaking.

The modular support tray 20 is preferably made of stainless steel to withstand corrosive environments. Should the desired environment be non-corrosive, other types metals, plastics, resins, and/or polymers might be used. The modular support tray 20 may be manufactured in virtually any length, width and thickness of material, selection of these variables dependent upon the environment, the space available and the length, diameter and weight of the fluid filled tubing 12. The modular support tray 20 further incorporates a plurality of apertures 34. These apertures 34 are equally sized and are equidistantly spaced along the full length, height and width of the modular support tray 20. These apertures 34 will not only function as a module connector engagement means but will have a number of other uses as will be described below.

Figure 3A:
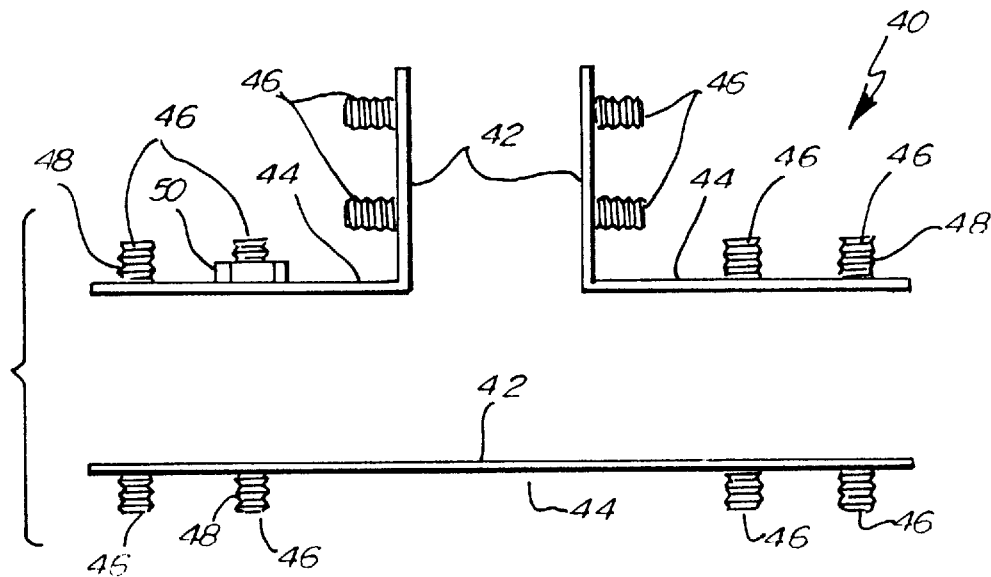
FIG. 3A is a top view of a set of tee configuration module connector portions.
Figure 3B:
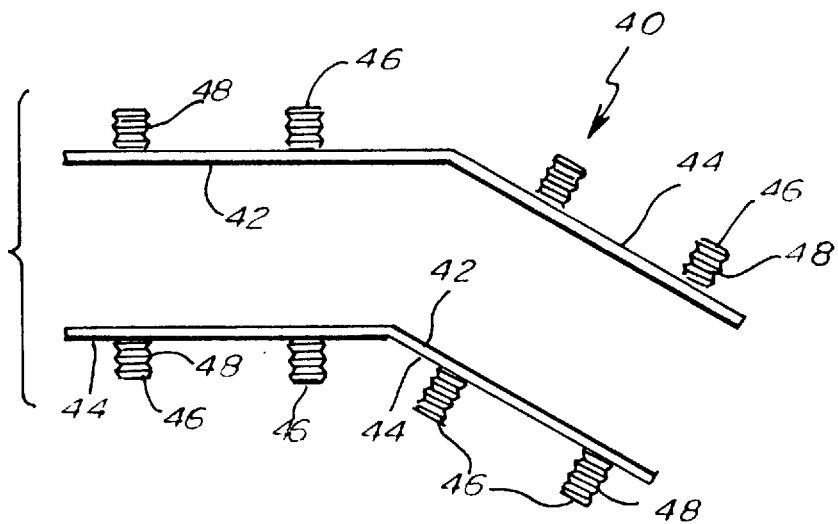
FIG. 3B is a perspective view of a set of elbow configuration module connector portions.
Figure 5:
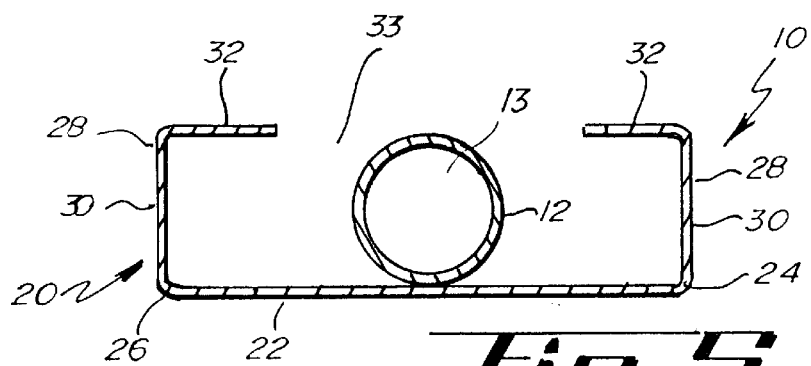
FIG. 5 is a sectional view of the present invention taken along line 5—5 of FIG. 2.

The module connector portion 40 or module connector means, comprises a planar rear face 42 that faces into the open top channel 33, a planar front face 44 and a plurality of extending connectors 46. The connectors 46 are preferably integral with the front face 44 extending outward therefrom. The connectors 46 are inserted through the apertures 34 of the modular support trays 20 until the front face 44 is proximate the side planar portion 30 of the side constrainment portion 28. Some of the connectors 46 are inserted through apertures 34 in a first modular support tray 20 while the remainder of the connectors 46 are inserted through the apertures 34 of a second modular support tray 20 so as to join and connect the modular support trays 20 into a single continuous unit, as shown in FIG. 2. Note that the module connector portions 40 may take a number of configurations such as straight, elbow or tee configurations, see FIGS. 3A and 3B. The connectors 46 preferably incorporate threads 48 or a threaded portion such that a nut 50 may be threaded onto the connector 46 to secure the module connector portion 40 to the modular support tray 20. The module connector portion 40 is also suitably made of a stainless steel to withstand a corrosive environment however, other types of metals, plastics, resins, and/or polymers may be used for non-corrosive environments.

The clamping portion 60, or clamping means, of the modular tubing support and constrainment device 10, is in the configuration of a clamping block 62, see FIGS. 1, 2 and 4. The clamping block 62, made of a solid, rigid material such as stainless steel, other metals, plastics, resins or polymers (stainless steel may be a necessity in corrosive environments), has an arcuate bore 64 therethrough. The clamping block 62 is sized to fit within the open top channel 33 while the arcuate bore 64 is sized to fit snugly about the outer diameter of the flexible tubing 12. To enhance the gripping and/or constraining ability of the clamping block 62 about the tubing 12, the arcuate bore 64 may be lined with an elastomeric material 66 or elastomeric lining means. To secure the clamping block 62 to the modular support tray 20, the clamping block 62 integrates a plurality of holes 68 for accepting clamping devices 70. The clamping devices 70 are preferably the combination of bolts 72 and nuts 74. The bolts 72 are inserted through the holes 68 and further through the apertures 34 located on the bottom portion 22 of the modular support tray 20 where they are secured to the modular support tray 20 by use of the nut 74 threaded tightly onto the bolt 72. The clamping portion 60 helps to relieve the stress that is placed on the tube fittings by the expansion and snaking of the tubing 12. In this manner, the stress caused by the snaking is virtually stopped at the clamping block 62 by the solid and rigid structure of the block 62. Further, the solidness and rigidness of the clamping block 62 serves to constrain or minimize the expansion of the tubing 12 at the block 62 acting as a safety protect for the tube fittings.

The modular tubing support and constrainment device 10 is appropriate for a vertical, horizontal or angled tubing 12 runs. Installation of the device 10 is straight forward: (1) the length, layout and diameter of the tubing 12 run is determined; (2) the appropriate lengths and numbers of modular support trays 20 are selected as are the appropriate numbers and shapes (e.g. straight, tee, or elbow) of module connector portions 40 according to the tubing 12 run; (3) the modular support trays 20 may then be either: (a) connected by the module connector portions 40 and positioned; or (b) positioned first and then connected by the module connector portions 40; (4) the flexible tubing 12 is run through the open top channel 33 of the modular support tray 20; and (5) the flexible tubing is clamped at its first and second ends 14, 16 by the clamping portion 60, any length of tubing may be existent between the first and second ends 14, 16. The above steps may be performed in any order. The tubing 12, or piping, is connected to other tubing lengths or machine parts via various tube fittings (not shown). Positioning of the modular support trays 20 refers to the fact that the modular support trays may be fastened to a wall or surface by various fastening means such as bolts, anchors, clamps, hangar supports, brackets, wire, adhesive or any other suitable means.

Note that in a horizontal tubing run the modular support tray 20 provides the benefit of actually supporting the weight of the fluid filled tubing 12 in addition to the constrainment of snaking and tube expansion. In a vertical tubing run, the modular support 20 provides a surface against which the tubing 12 may rest in addition to the constrainment of snaking and tube expansion. The weight of the fluid filled tubing may be, in part, supported by the clamping portion 60 of the device 10. In an angled tubing run, the constrainment of snaking and tube expansion is present, further the modular support tray 20 may or may not function to support the weight of the fluid filled tubing depending on the angle of incline.

Figure 7:
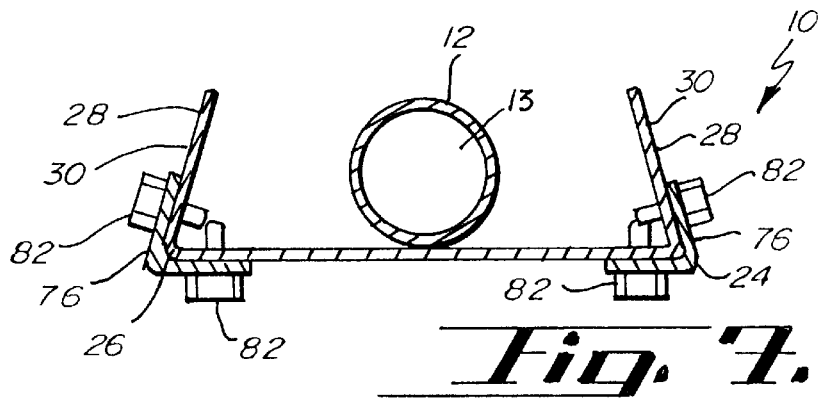
FIG. 7 is a front elevation of yet another alternative embodiment of the present invention showing the bottom portion having non-integral side constrainment portions that are attached to the bottom portion through use of a clamping bar.

An alternative embodiment of the modular tubing support and constrainment device 10 provides for the elimination of the clamping portion 60. FIG. 7 depicts a modular support tray 20 with the tubing 12 lying therein, absent the clamping portion 60. Such an embodiment would be appropriate if there is little concern about stress on the tube fittings.

Figure 6:
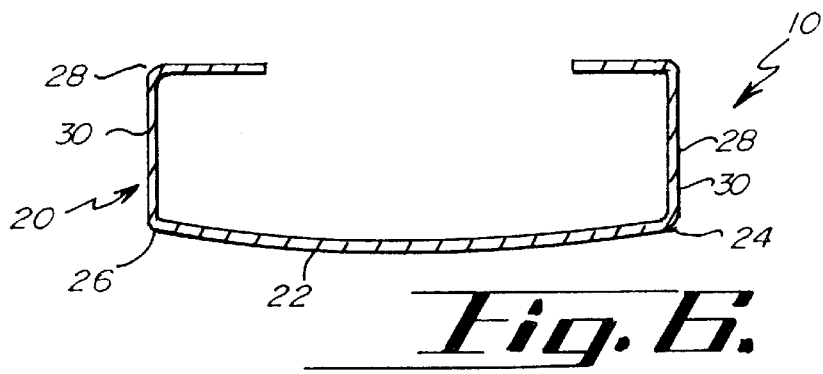
FIG. 6 is a front elevation of an alternative embodiment of the present invention showing the modular support tray having a curvilinear bottom portion and integral side constrainment portions having only a side portion that is perpendicular to the sides of the bottom portion.

Yet another alternative embodiment of the modular tubing support and constrainment device 10 is shown in FIG. 6. In this embodiment, the bottom portion 22 of the modular support tray 20 is not planar but rather curvilinear in shape. Depending on the user's application numerous other bottom portion shapes may be appropriate as well, e.g. a rounded wave pattern across the width of the bottom portion 22, a pointed wave pattern across the width of the bottom portion 22, a recessed trough provided in the bottom portion 22, etc. This embodiment has also eliminated the top planar portion 32 of the side constrainment portion. While the top planar portion 32 provides extra snaking constrainment protection it is not absolutely necessary. The top planar portion 32 may be eliminated in any embodiment or configuration and as such, the open top channel 33 existent between the top planar portions will also be eliminated. Therefore, one only need be concerned that the tubing 12 and clamping portion 60 (if used) fit within the side portions 30.

Figure 8:
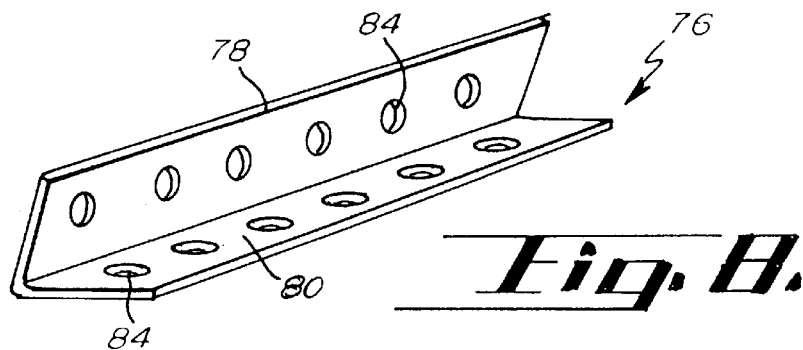
FIG. 8 is a perspective view of the clamping bar used in FIG. 7.

Still another alternative embodiment is disclosed in FIG. 7. Here, the side constrainment portions 28 are not integral with the bottom portion 22. Rather, the side constrainment portions 28 are connected to the bottom portion through use of a clamping bar 76 shown in FIG. 8. The clamping bar 76 has a side face 78 and a bottom face 80, the side face 78 attached to the side constrainment portion 28 and the bottom face 80 attached to the bottom portion 22 with an attachment device 82, such as a bolt/nut or screw/nut combination, that is inserted through an aperture 84 in the clamping bar and an aligned aperture 34 in the modular support tray 20. The clamping bar 76, as shown in FIGS. 7 and 8, has an angled configuration that also causes the attached side constrainment portions 28 to be at an angle to the bottom portion 22. This variation, wherein the side constrainment portions 28 are at an angle (acute or obtuse) to the bottom portion 22, may be used in any embodiment or configuration whether or not the side constrainment portion 28 is integral or non-integral with the bottom portion 22.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A combination of tubing for conveying fluids and a tubing support and constrainment device, the combination comprising:
    (a) flexible tubing with a fluid flow concourse;
    (b) plurality of modular tray means, each modular tray means comprising a support means for supporting tubing wherein said tubing has an end, a side constrainment means engaged with said support means for constraining side to side movement of said tubing, and a module connector engagement means;
    (c) module connector means for engaging said module connector engagement means and for joining one of said modular tray means to another; and
    (d) clamping means for constraining said end of said tubing and for securing said tubing to said modular tray means, said clamping means engaged with said module connector means.

2. A modular tubing and constrainment device for supporting and constraining tubing, comprising:
    (a) flexible tubing having a fluid concourse;
    (b) a modular support tray having a bottom portion and a side constrainment portion for constraining side to side movement of said tubing, and a plurality of apertures; and
    (c) a module connector portion comprising a connector removably insertable through said apertures and removably attachable to said modular support tray.

3. The modular tubing and constrainment device of claim 2, further comprising a plurality of modular support trays and wherein said module connector portion is adapted to connect one modular support tray to another.

4. The modular tubing and constrainment device of claim 2, further comprising a clamping portion.

5. The modular tubing and constrainment device of claim 2, wherein said bottom portion is non-planar.

6. The modular tubing and constrainment device of claim 2, wherein said bottom portion is curvilinear.

7. The modular tubing and constrainment device of claim 2, wherein said side containment portions are not perpendicular to said bottom portion.

8. A modular tubing support and constrainment device for supporting and constraining tubing, comprising:
    (a) flexible tubing with a fluid concourse;
    (b) a modular support tray, said modular support tray comprising a bottom portion, a side constrainment portion engaged with said bottom portion, and a plurality of apertures;

(c) a module connector portion having a connector that is removably insertable through said apertures and removably attachable to said modular support tray; and (d) a clamping portion removably attachable to said modular support tray.

9. The modular tubing support and constrainment device of claim 8, wherein the tubing has a defined diameter measurement and wherein said side constrainment portion has a height in the range that is equivalent to or greater than said defined diameter measurement.

10. The modular tubing support and constrainment device of claim 8, wherein said clamping portion comprises a clamping block having an arcuate bore therethrough, said arcuate bore sized to fit snugly about said tubing.

11. The modular tubing support and constrainment device of claim 10, wherein said clamping block further comprises a plurality of clamping devices, said clamping devices removably insertable through said apertures of said modular support tray and removably attachable to said modular support tray.

12. The modular tubing support and constrainment device of claim 10, wherein said arcuate bore is lined with an elastomeric material.

13. The modular tubing support and constrainment device of claim 8, wherein said modular support tray has a defined height, width and length, and said apertures are equidistantly spaced along said full height, width and length of said modular tray.

14. A modular tubing support and constrainment device for supporting and constraining tubing, comprising:

(a) a plurality of modular support trays each comprising a bottom planar portion having a first and second side, an integral side constrainment portion extended from said first side, an integral side constrainment portion extended from said second side, and a plurality of equidistantly spaced apertures;

(b) a module connector portion comprising a front planar surface having a plurality of connectors extending therefrom, said connectors removably insertable through said apertures and removably attachable to said modular support tray; and (c) a clamp portion, said clamp portion having an arcuate bore therethrough, said clamp portion removably attachable to said modular support tray.

15. The modular tubing support and constrainment device of claim 14, wherein said tubing has a defined diameter measurement and wherein the height of said side planar surface is in the range that is equivalent to or greater than said defined diameter measurement.

16. The modular tubing support and constrainment device of claim 14, wherein said integral side constrainment portion comprises a side planar surface and a top planar surface.

17. The modular tubing support and constrainment device of claim 14, wherein said arcuate bore is lined with an elastomeric material.

18. The modular tubing support and constrainment device of claim 14, wherein said clamp portion is comprised of a clamping block, said clamping block having a plurality of holes for accepting clamping devices, said clamping devices removably insertable through said holes and through said apertures, said clamping devices removably attachable to said bottom planar portion of said modular support tray.

19. The modular tubing support and constrainment device of claim 14, wherein said module connector portion is of a tee configuration.

20. The modular tubing support and constrainment device of claim 14, wherein said module connector portion is of an elbow configuration.

* * * * *

UNITED STATES PATENT AND TRADEMARK OFFICE
CERTIFICATE OF CORRECTION

| | |
|---|---|
| PATENT NO. | : 5,871,182 |
| DATED | : February 16, 1999 |
| INVENTOR(S) | : Michael W. Johnson, Jeffrey J. McKenzie |

It is certified that error appears in the above-identified patent and that said Letters Patent is hereby corrected as shown below:

<u>Column 3,</u>
Line 32, after "12" please insert -- with a fluid concourse 13 -- with the number "13" in bold type Signed and Sealed this Sixth Day of November, 2001

*Attest:*

NICHOLAS P. GODICI
*Attesting Officer*    *Acting Director of the United States Patent and Trademark Office*